June 17, 1952 | A. W. NOLLE | 2,600,423

ELECTRICAL SYSTEM WITH OUTPUT SIGNAL VARYING LOGARITHMICALLY WITH RESPECT TO THE INPUT SIGNAL

Filed April 30, 1948 | 3 Sheets-Sheet 1

Inventor
Alfred Wilson Nolle
by Roberts, Cushman & Grover
Atty's

ELECTRICAL SYSTEM WITH OUTPUT SIGNAL VARYING LOGARITHMICALLY WITH RESPECT TO THE INPUT SIGNAL

Filed April 30, 1948 3 Sheets-Sheet 2

Inventor
Alfred Wilson Nolle
by Roberts, Cushman & Grover
Att'ys

ELECTRICAL SYSTEM WITH OUTPUT SIGNAL VARYING LOGARITHMICALLY WITH RESPECT TO THE INPUT SIGNAL

Inventor
Alfred Wilson Nolle
by Roberts, Cushman & Grover
Atty's

Patented June 17, 1952

2,600,423

UNITED STATES PATENT OFFICE 2,600,423

ELECTRICAL SYSTEM WITH OUTPUT SIGNAL VARYING LOGARITHMICALLY WITH RESPECT TO THE INPUT SIGNAL

Alfred Wilson Nolle, San Marcos, Tex., assignor to The Electrodyne Company, Boston, Mass., a corporation of Massachusetts Application April 30, 1948, Serial No. 24,263

24 Claims. (Cl. 171—95)

Various methods and devices have heretofore been proposed for delivering an output current or voltage which is proportional to the logarithmic amplitude of an input voltage or current derived from some physical phenomenon to be evaluated or measured. Some of these systems utilize instruments in which logarithmic deflection of a pointer is obtained through the use of a nonlinear electromechanical device, or of arrangements which derive a logarithmic characteristic from special properties of circuit elements such as vacuum tubes or materials with selected conductivity characteristics.

It is one of the main objects of the present invention to provide a system of that type, which responds logarithmically to an input signal, merely through proper use of linear passive circuit elements without employing any peculiar operation characteristics of vacuum tubes or other circuit elements and which is, therefore, independent of such characteristics which are often uncontrollably variable, the system response being due only to the use of standard elements with regard to their most favorable unchanging and stable operation characteristics and is, therefore, reliable, exact, easy to maintain in proper operating condition and comparatively inexpensive.

In a broad aspect the invention contemplates an electrical system with an output signal varying logarithmically with respect to an input signal comprising an attenuation network having a logarithmic voltage-time characteristic, a source of potential proportional to the magnitude of the input signal, and a source of constant peak potential which, in different aspects of the invention, may be either a constant magnitude direct potential or an alternating potential having a wave shape with a constant peak amplitude. Connections are provided to energize the network from one of these sources and for applying the other source to the network as a comparative attenuation standard.

In other aspects the attenuation network is energized by either the potential proportional to the magnitude of the input signal source or by the source of constant peak potential as defined above, the other source being used as a comparative attenuation standard. In all aspects the network operates a timing device during the time interval required for attenuation between the limits of a potential equal in magnitude and opposite in polarity to the potential of the comparative standard and a potential with a magnitude determined by the magnitude of the energizing source thereby to obtain a function expressing in terms of time a logarithmic correlation of the amplitudes of the input and output signals.

In other aspects the attenuation network includes a reactive impedance and a series connected resistor with the energizing potential being supplied by a square wave generator, and the timing device including a vacuum tube amplifier. The tube has a grid and cathode connected to the output terminals of the attenuation network. The tube anode is connected in series with a unidirectional current limiter and a meter. The grid bias of the tube is such that current flows through the anode circuit and thus through the meter only during the time intervals required for attenuation between the limits of a potential equal in magnitude and opposite in polarity to the potential used as a comparative standard, and a potential with a magnitude determined by the magnitude of the potential of the energizing source and the attenuation rate of the network.

The latter, limiting potential is the potential of the network output terminals at the beginning of each succeeding cycle when a square wave potential having an amplitude proportional to the input signal is applied to the network as the energizing potential. When the network is energized by a square wave with a constant peak amplitude, the latter limiting potential is that potential across the network output terminals of which attenuation has taken place by the end of a half wave cycle.

In one specific aspect a capacitor and a resistor of an attenuation network are connected in series with a square wave generator. The anode of a rectifying diode for the positive portion of the input signal is linked with the input signal source, the associated cathode being coupled by a ripple filter with the cathode of a limited diode whose anode connects with the output terminal of the square wave generator. The cathode of a second rectifying diode for the negative portion of the input signal is likewise linked with the input signal source. A second ripple filter couples the anode of the second rectifying diode with the anode of a second limiter diode whose cathode connects with the generator output terminal.

To increase the sensitivity and linearity of the above diodes at low signal levels a connection is provided to a direct power source so that a small current continuously circulates therethrough whereby the amplitude of the square wave impressed upon the network is always proportional to the input signal. The direct power source is also connected to the attenuation network through a resistor to impress a comparative attenuation standard potential thereupon.

The timing device includes two interconnected vacuum tubes each having a cathode, a grid and an anode. The first stage grid and cathode are connected to the output terminals of the attenuation network. The anode is coupled directly to the second stage grid and is also connected to the direct power source by means of a series resistor.

A second resistor links the second stage anode with the power source. A series connected meter and unidirectional current limiter provide a parallel path between the second stage anode and the power supply whereby during the time interval from the energization of the network by a negative wave from the square wave generator until the attenuation reaches a potential equal in magnitude and opposite in polarity to the comparative standard potential, the resultant negative potential on the grid prevents the first stage tube from conducting so that the positive potential on the second stage grid causes a current to flow through the meter whereby its indication is proportional to the duration of the current pulses applied thereto, thereby to express a logarithmic correlation of the amplitudes of the input and output signals.

Connections are also made between the direct power source and the meter to direct a reverse current therethrough thus preventing ambiguous indications when no current flows in the circuit of the second stage anode during intervals when the first stage grid is at a positive potential.

In another specific aspect the series connected capacitor and resistor of the attenuation network are coupled to the input signal source by means of a full wave rectifier and a ripple filter so that a negative potential proportional to the amplitude of the input signal is impressed upon the network as a comparative attenuation standard. The network is energized by a square wave generator with an output terminal connected to the input terminal of the network.

To maintain the amplitude of the square wave from the generator constant, the anode of a diode is connected to the generator output terminal. The diode-cathode is coupled to the more positive terminal of a bleeder resistor connected to the direct power source thereby to limit the positive peak amplitude of the generator output. The negative peak amplitude is limited by a second diode having an anode and cathode linked to the more negative terminal of the bleeder resistor and the generator output terminal respectively.

The output terminals of the network are connected with a timing device including two vacuum tubes interconnected as a two-stage amplifier with the first-stage grid and cathode coupled to the output terminals of the attenuation network. The first-stage anode is connected to the square wave generator by a series resistor and is also linked directly to the second-stage grid. The second-stage anode is connected to the direct power source by both a resistor and a parallel path including a unidirectional current limiter and a meter connected in series therewith whereby during the interval beginning at the time the potential of the attenuation network is equal in magnitude and opposite in polarity to the potential of the comparative standard and terminating at the start of the next half cycle by the reversal of polarity of the potential upon the first stage anode, the meter indication is proportional to the duration of the current pulses applied thereto, thereby to express a logarithmic correlation of the amplitude of the input and output signals.

A feature of the invention is an electrical circuit for supplying a square wave with an amplitude proportional to an input signal. This circuit comprises two rectifying elements connected to the input signal source, one of these elements rectifying the positive portion of the signal, the other element rectifying the negative signal portion. A unidirectional element connects the respective rectifying elements in the opposite sense with the output terminal of a square wave generator whereby the amplitude of the square wave is limited to the magnitude of the positive and negative potentials impressed on the unidirectional elements by the respective rectifiers upon the conduction of one of the unidirectional elements whenever the potential correlated therewith is exceeded.

Another feature is an electrical network for completely cutting off the flow of current in the output circuit thereof in response to a predetermined change in the potential of an input signal. This network comprises a two-stage amplifier including two interconnected vacuum tubes with the first-stage grid and cathode connected to the output terminals of an input signal source. The first stage anode is connected to a direct power supply by a series resistor and is also linked directly to the second stage grid. The second stage anode is connected to the power supply by both a resistor and a parallel path including a unidirectional element, a meter and the network output terminals connected in series between the anode and power supply whereby the application to the first stage grid of a signal having a potential characteristic to cause a current flow through the resistor in series with the first stage anode results in a voltage drop which impresses upon the second stage grid negative potential sufficient to cut off the second stage tube so that a positive potential is impressed upon the unidirectional element in the sense to prevent the element from conducting.

These and other objects, aspects and features of the invention will be apparent from the several specific embodiments thereof illustrated in the accompanying drawings in which.

Figure 1:
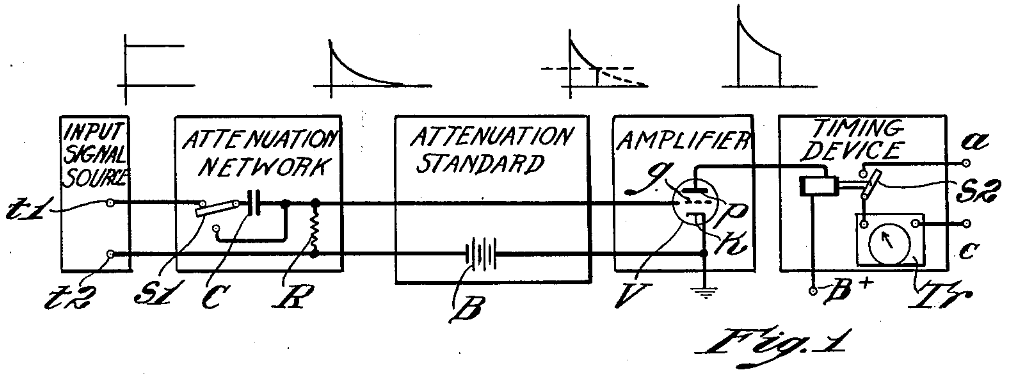
Fig. 1 is a block diagram of a simple embodiment of the invention whereby the output signal is logarithmically correlated to a constant input signal.

In Fig. 1 is shown an embodiment of the invention whereby an elapsed interval of time as measured by an electrical timer Tr is proportional to the logarithmic amplitude of a voltage pulse applied across the terminals t1 and t2 of an input signal source. Terminals t1 and t2 are connected in series with a capacitor C and a resistor R of an attenuation network by one position (as shown) of a single pole double throw switch S1. When in the opposite position, the switch S1 provides a short circuiting connection to discharge the capacitor C.

One terminal of the resistor R is joined to the grid g of a vacuum tube V, the other resistor terminal being linked with the negative pole of an attenuation standard such as the battery B supplying a constant magnitude direct potential. The tube anode p is joined with the terminal of a "B+" power supply (not shown) through the solenoid of a relay S2. The normally opened contacts of the relay S2 are connected in series with a timing device such as the electrically driven timer Tr and the terminals a and c of a conventional power supply (not shown).

Figures 2, 7:
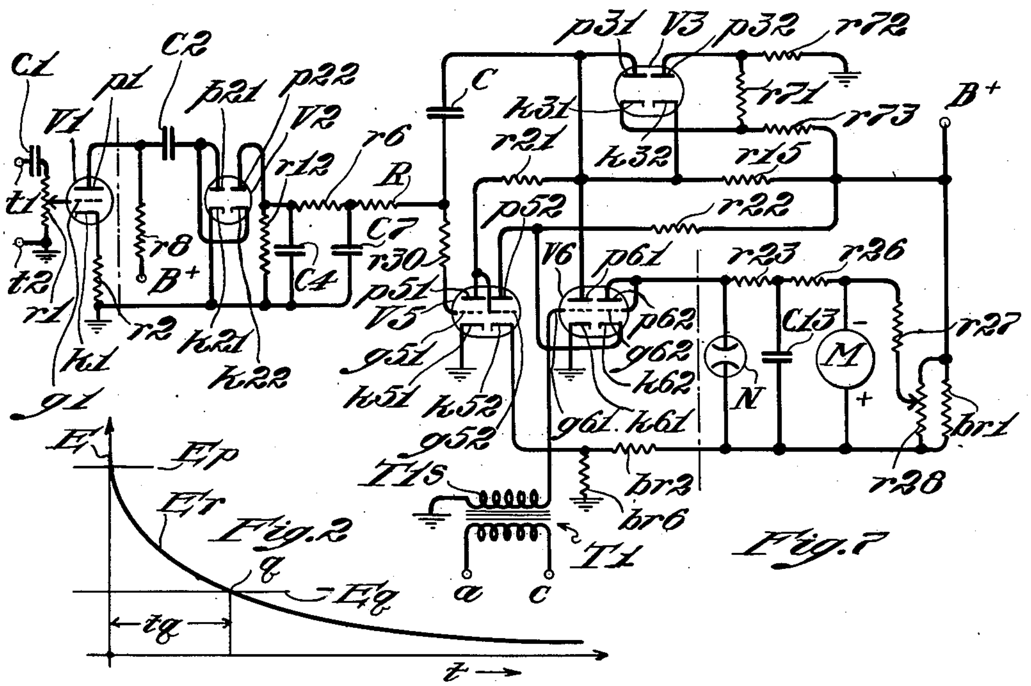
Fig. 2 is a graphical representation of the output potential of the attenuation network in Fig. 1 as a function of time.
Fig. 7 is a wiring diagram of the embodiment shown in Fig. 6.

Operation of the above circuit can best be understood by referring to the diagram in Fig. 2 wherein the line Er graphically represents the exponential relationship of the voltage drop across the resistor R as a function of time after a direct voltage of the magnitude Ep has been applied to the terminals t1 and t2 (Fig. 1). This relationship is also expressed mathematically as $E=Ep \exp(-t/RC)$, the well known expression for the charge or discharge of a capacitor through a series resistor, where R and C are the ohmic impedance of the resistor R and the capacitance of the capacitor C respectively and E is the voltage across the resistor after the elapse of a time $t$. Expressed in another manner $$t=RC(\ln Ep-\ln E)$$

From the above it is evident that the time $tq$ for attenuation of the voltage across the resistor R to the constant potential Eq of the attenuation standard is, therefore, expressed as $tq=RC(\ln Ep-\ln Eq)$.

As the magnitude of the impedance characteristics of the capacitor C, the resistor R and the attenuation standard potential Eq supplied by the battery B remain constant, it can be readily seen that the time $tq$ is a function of the natural logarithm of the signal input voltage Ep.

When a direct voltage is applied across the terminals t1 and t2 by the closing of the switch S1 to the position shown, the capacitor C begins to charge through the resistor R. The flow of current through the resistor R results in a voltage drop Er initially sufficient in magnitude and of such polarity as to oppose the voltage of the battery B so that the grid g of the tube V becomes positive with respect to the cathode k. As long as the grid g is relatively positive, current flows in the anode circuit to energize the coil of the relay S2 and thereby to close its contacts. The closing of these contacts energizes the timing device Tr from the terminals a and c of a power supply (not shown) so that the measurement of a time period is started.

As shown by the diagram in Fig. 2, the voltage drop Er across the resistor R attenuates until it reaches a point q where it is equal in magnitude and opposite in polarity to the voltage Eq of the battery B. As the grid g becomes negative the tube V no longer conducts and the circuit of the timer Tr is open. From the above it can be seen that the length of this elapsed time is a function of the input signal voltage and as measured by the timer Tr provides a logarithmic measure of the magnitude thereof.

Figure 3:
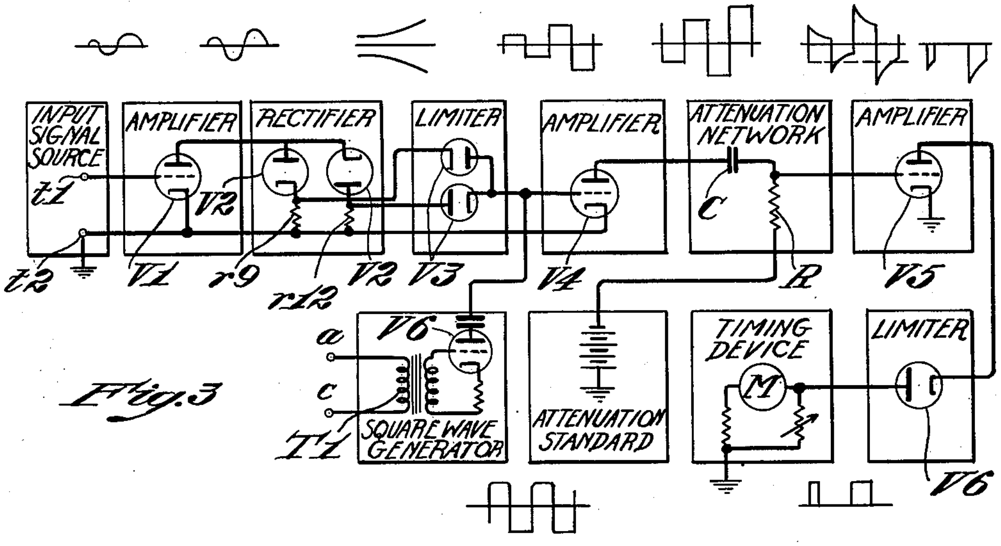
Fig. 3 is a block diagram of a second embodiment of the invention whereby the output signal is logarithmically correlated to a varying input signal.

In Fig. 3 is shown another embodiment with a more elaborate circuit whereby it is possible to obtain a continuous logarithmic indication of the magnitude of a varying input signal, for example, such as a signal from a microphone located in an acoustical test chamber.

Figure 4:
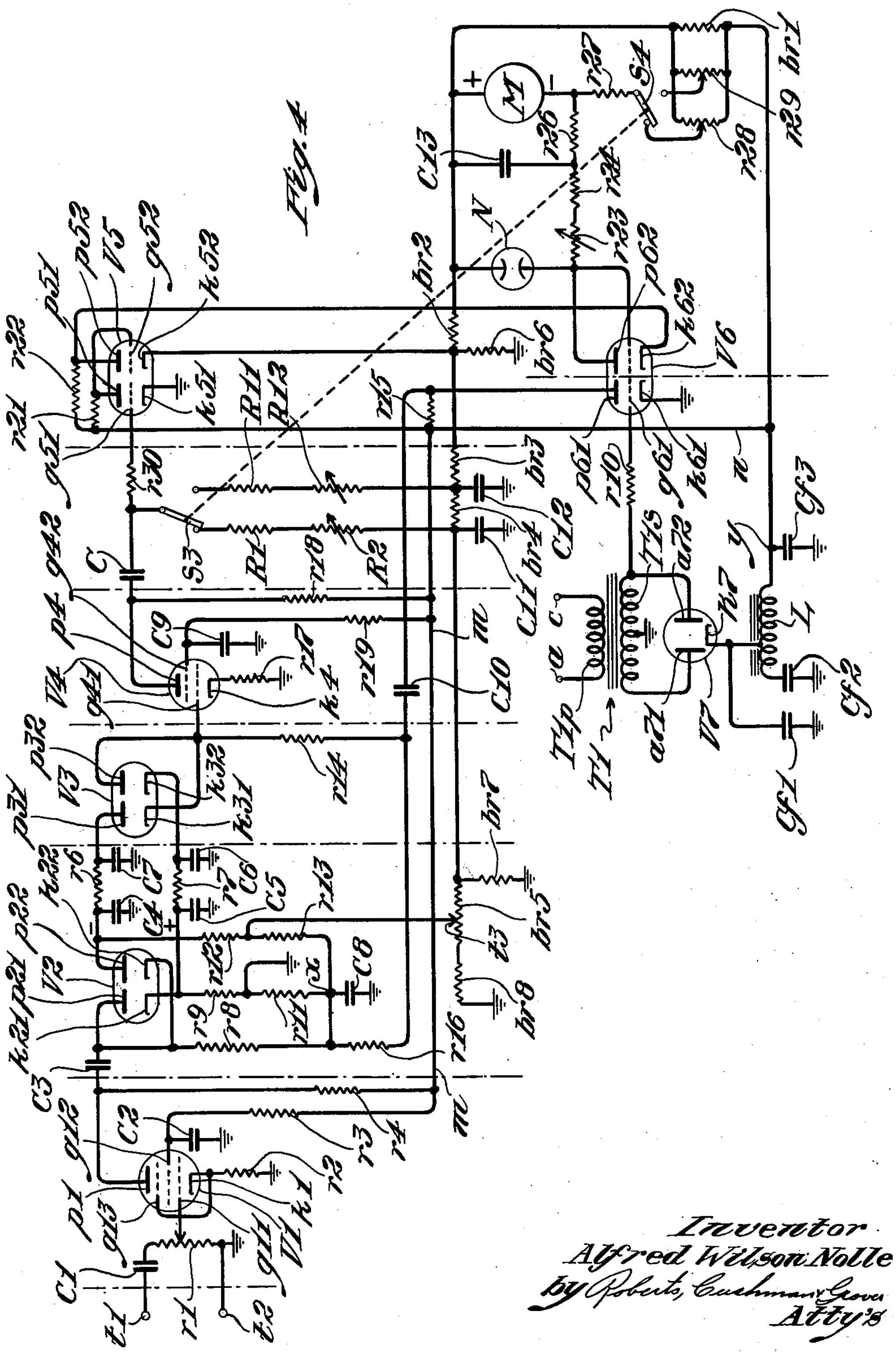
Fig. 4 is a detailed wiring diagram of the embodiment shown in Fig. 3.

The detailed wiring connections of this embodiment are shown in the diagram in Fig. 4. The terminals t1 and t2 of the microphone or other input signal source are connected by means of a coupling capacitor c1 across a potentiometer r1 the adjustable tap of which is joined to the the control grid g11 of an amplifier such as the pentode vacuum tube V1.

The tube suppressor grid g13 and the cathode k1 are linked together and grounded through the grid biasing resistor r2. The screen grid g12 is connected to a grounded bypass capacitor c2 and to a direct power supply (described hereinafter) by means of a series resistor r3 and the leads m and n. The power supply is similarly connected by the leads m and n to the anode p1 through a series resistor r4. The anode p1 is also connected by a coupling capacitor c3 with the anode p21 and the cathode k22 of a double diode vacuum tube V2, which provides rectification of the negative and positive portions of the amplified input signal. The remaining anode p22 and cathode k21 are linked with the anode p31 and the cathode k32 of a second double diode vacuum tube V3 by the resistors r6 and r7 respectively. The bypass filter capacitors c4 and c7 are connected between the respective ends of the resistor r6 and ground. Each end of the resistor r7 is grounded analogously by the capacitors c5 and c6 respectively. The commonly connected cathode k22 and the anode p21 of the tube V2 are linked to a point x by means of a resistor r8. The cathode k21 also connects with the point x through two series resistors r9 and r11. Resistors r12 and r13 connect the anode p22 to the point x in similar manner. By choosing the resistors r12 and r13 so that they have the same ohmage as the resistors r9 and r11 respectively, the point x is maintained at an average potential midway between the positive and negative potentials appearing at the input terminals of the resistors r7 and r6 respectively whenever an amplified input signal is rectified by the diodes in tube V2. The mid-potential point x is connected to ground by a capacitor c8.

The connecting of the large capacitor c5 in parallel with the load resistor r9 of the positive diode rectifier of the tube V2 increases the direct voltage output of the rectifier and reduces the ripple component in the rectifier output as the capacitor charges nearly to the peak voltage of the rectifier output. The capacitor c5 also makes the rectifier direct current output proportional to the peak rather than the average value of the A.-C. input signals. Further filtering action is provided by the resistor r7 and the capacitor c6 so that a relatively constant direct potential is impressed on the cathode k32. The negative potential developed across the load resistor *r*12 is increased and filtered in analogous manner by the capacitors *c*4 and *c*7 and the resistor *r*6 before it is impressed on the anode *p*31.

To improve the rectifying and limiting performance at low signal levels of the double diode vacuum tubes V2 and V3 respectively, a small direct current is passed through these tubes in the absence of an input signal. This direct current is obtained from an adjustable tap *t*3 of a bleeder resistor *br*5 which is one of a plurality of such resistors including *br*1, *br*2, *br*3, *br*4 and *br*8 series-connected between a positive terminal *y* of the direct power supply and ground. The common junctions between resistors *br*2 and *br*3 and between resistors *br*4 and *br*5 are also connected to ground through the resistors *br*6 and *br*7 respectively.

As stated above *r*9 and *r*12 are the load resistors for the double diode V2 across which are developed the positive and negative potentials respectively resulting from an input signal from the amplifier V1. The resistors *r*11 and *r*13 are of much smaller ohmage than the resistors *r*9 and *r*12 and comprise the combination across which the potential difference between the tap *t*3 and ground appears so that a small adjustable direct current flows through all the diode elements continuously in two parallel paths regardless of whether or not an input signal is present. The first path includes *r*12—*p*22—*k*22—*p*21—*k*21—*r*9— to ground. The second parallel path includes *r*12—*r*6—*p*31—*k*31—*p*32—*k*32—*r*7, *r*9 to ground.

The flow of this small direct current insures that at low input signal levels, the diodes are passing sufficient current so that their respective plate resistances do not reach the high values found in the very low current regions. A second advantage of avoiding the low current regions is the tendency under such operating conditions of a diode to act as a battery producing a direct output voltage in the absence of an alternating input voltage as a result of the finite emission velocity of the electrons and of contact different of potential between the respective plates and cathodes.

The anode *p*32 and the cathode *k*31 of the tube V3 are linked with the control grid *g*41 of an amplifier tube V4. These electrodes are also interconnected with point *x* through the resistors *r*14 and *r*16. The cathode *k*4 is grounded through a grid biasing resistor *r*17. The anode *p*4 and the screen grid *g*42 are connected to the lead *m* from the direct power supply by means of the series resistors *r*18 and *r*19 respectively. The screen grid *g*42 is also connected to ground through a conventional bypass capacitor *c*9.

It will be noted that the cathode resistor *r*17 is not bypassed by a capacitor so that the alternating component of the anode current flows through the resistor *r*17 as well as the impedance of the anode circuit. This current produces a voltage drop across the resistor *r*17 which is impressed upon the cathode *k*4 but not upon the grid *g*41 and is, therefore, a part of the effective signal impressed between the grid *g*41 and the cathode *k*4. Such a signal is of the same frequency but opposite in phase to the square wave on the grid *g*41 so that it constitutes a current type of feedback which has two results. First, the gain of the V4 amplifier stage is relatively independent of individual tube characteristics or variations in power supply voltage; and second, the output impedance of the tube V4 (the effective anode resistance) is large as compared with the impedance of load resistor *r*18 so that the following RC circuit [described in detail below] is driven effectively by a generator with an impedance approximately equal to the resistor *r*18 and which is not critically dependent upon the anode resistance of the tube V4.

An energizing potential with a square wave shape obtained by clipper action from one of the anodes *p*61 of a double triode vacuum tube V6 is also impressed upon the grid *g*41 of the tube V4 by coupling the anode *p*61 to the common junction of the resistors *r*14 and *r*16 respectively by means of a capacitor *c*10. The frequency of the wave is determined by a large sinusoidal voltage from one of the secondary windings T1*s* of a power supply transformer T1 which is applied between the grid *g*61 and the grounded cathode *k*61 by a limiting resistor *r*10. The direct current for the anode *p*61 is supplied from the direct power supply through a series resistor *r*15 and the lead *n*.

As described, heretofore, the grid *g*41 is connected to the cathode *r*31 and the anode *p*32 of the double diode V3. These connections prevent the grid *g*41 from becoming more positive than the cathode *k*32 or more negative than the anode *p*31 because if either potential is exceeded the corresponding diode conducts which is the equivalent of connecting the grid *g*41 to either *k*32 or *p*31 (as the case may be) by means of a small resistor (the internal resistance of the respective diode). The potentials on the cathode *k*32 and the anode *p*31, respectively, with reference to the point *x* which is connected to *g*41 by the resistors *r*14 and *r*16 are determined by the magnitude of the rectified signals.

As can be readily seen, the signal on the grid *g*41 consists of a square wave with a peak to peak amplitude proportional to the input signal amplitude and with a frequency of the potential at the terminals *a* and *c* of the alternating power source.

Transformer T1 also is used in the conventional manner as the voltage step-up device of the direct current power supply to which reference has been made heretofore. The primary winding T1*p* is connected to the terminals *a* and *c* of a single phase alternating power supply of the usual type (not shown). The center tap of the secondary winding T1*s* is grounded and the end terminals are joined with the anodes *a*71 and *a*72 respectively of a full wave rectifier tube V7. The lead from the cathode *k*7 branches to connect with both the grounded filter capacitor *cf*1 and a tap on the winding of the hum-bucking filter choke L. The end terminals of the choke winding are grounded through the filter capacitors *cf*2 and *cf*3 respectively. The lead *n* supplying power to the respective tube anodes and the first bleeder resistor *br*1 are connected to the common junction *y* of the winding of the choke L and the filter capacitor *cf*3.

The anode circuit of the tube V4 connects with one plate of a capacitor C of an attenuation network which also includes the series connected resistors R1 and R2. Resistor R2 is made adjustable to obtain a means of calibrating the scale factor of an output meter M. The connection between one end of the resistor R1 and the capacitor C is completed when a switch S3 is thrown to the position shown. The lower terminal of the resistor R2 is connected to ground through a capacitor *c*11 and to the common junction of the bleeder resistors $br4$, $br5$ and $br7$ to provide a positive reference voltage of constant magnitude as a comparative attenuation standard.

The capacitor $c11$ provides a low impedance path to ground for alternating currents in the attenuation network so that surges in the bleeder circuit resulting from the passage of pulses of direct current through the meter M (as will be described in detail hereinafter) do not produce appreciable voltage changes in the attenuation network. Conversely, voltage changes in the attenuation network do not produce appreciable alternating voltages in the bleeder circuit so that neither the meter circuit nor the rectifier circuits which are connected through the tap $t3$ are affected.

The resistors R11 and R12 and the capacitor $c12$ are also connected in series between the switch S3 and ground so that the throwing of the switch changes the scale factor of the instrument. A reference voltage is obtained in an analogous manner by joining the common terminal of the resistor R12 and the capacitor $c12$ to the common terminal of the bleeder resistors $br3$ and $br4$. It will be noted that with the switch S3 in either position the effective resistance of the attenuation network in series with the capacitor C also includes the generator impedance of the vacuum tube V4.

The capacitor C is also coupled by a resistor $r30$ with one grid $g51$ of a double triode V5. The corresponding cathode $k51$ is grounded, bias for the grid $g51$ being supplied from the bleeder circuit through resistors R1 and R2 (or R11 and R12 as described heretofore). The anode $p51$ is coupled directly to the second grid $g52$ so that the double triode acts as a two stage amplifier. The cathode $k52$ is joined directly to the common junction of the bleeder resistors $br2$ and $br3$. The anode $p52$ is connected to the cathode $k62$ of the second double triode in the vacuum tube V6. The direct power supply is connected to both anodes $p51$ and $p52$ of the tube V5 by the lead $n$ and the series resistors $r21$ and $r22$ respectively.

The grid $g62$ and the anode $p62$ are linked so that the second triode enclosed in the envelope of tube V6 acts as a diode. These electrodes are also connected to the negative terminal of the milliammeter M by means of the series resistors $r23$, $r24$ and $r26$. The positive meter terminal is connected to the common junction of the bleeder resistors $br1$ and $br2$. A capacitor $c13$ connected between the positive meter terminal and the junction of the resistors $r24$ and $r26$ shunts the alternating current components around the meter M and also prevents rapid changes of meter indication. A glow tube N is connected between the positive meter terminal and the anode $p62$ to maintain a constant voltage across the meter M and the series resistors $r23$, $r24$ and $r26$. Resistor $r23$ is made adjustable and determines the current sensitivity of the meter circuit.

Whenever a signal impressed across the terminals $t1$ and $t2$ results in a potential upon the grid $g51$ which is negative with respect to the ground potential and greater in magnitude than the positive voltage $+E_q$ (equal to the voltage drop in the bleeder resistor $br7$) biasing the grid $g51$, thereby making the grid relatively more negative, the current flowing through the anode circuit of the first triode of tube V5 and hence through the resistor $r21$ is reduced. The reduction in the voltage drop across the resistor $r21$ causes the directly coupled grid $g52$ of the second V5 triode to become relatively more positive with respect to the cathode $k52$, which is at the positive potential above ground equal to the voltage drop in the bleeder resistor $br6$, whereupon the accompanying increase in current flow in the anode circuit of the second triode results in an increase in the voltage drop in the resistor $r22$. The cathode $k62$ in tube V6 being connected to the resistor $r22$ becomes negative with respect to the anode $p62$ so that diode-connected triode in tube V6 conducts and a current flows (in the conventional sense) from the point $y$ of the power supply through the bleeder resistor $br1$, the meter M, the series resistors $r26$, $r24$ and $r23$, the anode $p62$, the cathode $k62$, the anode $p52$, the cathode $k52$ and the resistor $br6$ to ground.

With no input signal at the terminals $t1$ and $t2$, the positive potential $+E_q$ is impressed between the grid $g51$ and the cathode $k51$ of the tube V5. The voltage drop in the resistor $r21$ resulting from current flow through the first triode impresses a potential on the grid $g52$ sufficiently negative with respect to the cathode $k52$ (which is at the positive potential of the bleeder resistor $br6$) to prevent the second triode from conducting. When the second triode is not conducting its anode $p52$ and the cathode $k62$ of the second triode in the tube V6 are at the positive potential of the power supply terminal $y$ and hence at a greater potential by the amount of voltage drop in resistor $br1$ than the anode $p62$ so that no current flows through the second triode of the tube V6 and the meter M.

The negative terminal of the meter M is also connected to the movable contact of a single pole double throw switch S4 through a resistor $r27$. Each of the two stationary contacts of the switch S4 is joined to the adjustable taps of the respective potentiometers $r28$ and $r29$, the windings of which are connected in parallel with the bleeder resistor $br1$. The switch S4 is mechanically linked with the switch S3 so that both switches are operated conjointly when a change of scale factor is required.

With the switch S4 in the position shown current from the power supply point $y$ flowing through the potentiometer $r28$ establishes a potential difference across the meter M and its series resistor $r27$. When in the absence of an input signal (as described above) no current is directed through the meter M by the tube V6, the voltage drop in the potentiometer 28 circulates a reverse direct current through the meter M and the series resistor $r27$. When the switch S4 is thrown in the opposite position to that shown, the potentiometer $r29$ circulates a reverse current through the meter circuit in an analogous manner. In either case the current is in such a direction as to move the meter indicator off scale whereby in the absence of an input signal the response of the instrument is unambiguous. The amount of reverse meter current is controlled by the adjustable taps of the potentiometers $r28$ and $r29$.

The following table lists the characteristics of the circuit elements of an instrument which has a response of 20 decibels with the resistors R1 and R2 in series with the capacitor C of the attenuation circuit. This instrument has a 30 decibel response with the resistors R11 and R12 connected in series with capacitor C.

*Characteristic of circuit elements—logarithmic response system (Fig. 4)*

Resistors:
- r1—1.0M
- r2—1K
- r3—.5M
- r4—56K
- r6—56K
- r7—56K
- r8—220K
- r9—56K
- r10—1.5M
- r11—400 w.
- r12—56K
- r13—400 w.
- r14—1.5M
- r15—56K
- r16—56K
- r17—670 w.
- r18—5.5K
- r19—33K
- r21—500K
- r22—500K
- r23—15K
- r24—20K
- r26—2K
- r27—100K
- r28—100K
- r29—100K
- r30—1.5M
- br1—4500 w.
- br2—7.5K
- br3—7K
- br4—1000 w.
- br5—400 w.
- br6—7K
- br7—5K Resistors:
- br8—400 w.
- R1—20K
- R2—15K
- R11—30K
- R12—20K Capacitors:
- C—.05 μfd.
- c1—.04 μfd.
- c2—0.1 μfd.
- c3—1.0 μfd.
- c4—0.5 μfd.
- c5—0.5 μfd.
- c6—0.5 μfd.
- c7—0.5 μfd.
- c8—40 μfd.
- c9—15 μfd.
- c10—1 μfd.
- c11—10 μfd.
- c12—1 μfd.
- c13—25 μfd.
- cf1—10 μfd.
- cf2—1 μfd.
- cf3—25 μfd.

Vacuum tubes:
- V1—6SJ7
- V2—6H6
- V3—6H6
- V4—6V6
- V5—6SL7
- V6—6SN7
- V7—5V4

Gas tubes:
- N—¼ watt neon bulb

Power transformer T1—Thordarson T70R61.
Filter choke L—Thermador Co. D2A.
Meter M—1 milliampere D.-C. meter.

*Operation of the embodiment in Fig. 4*

Figures 5, 8:
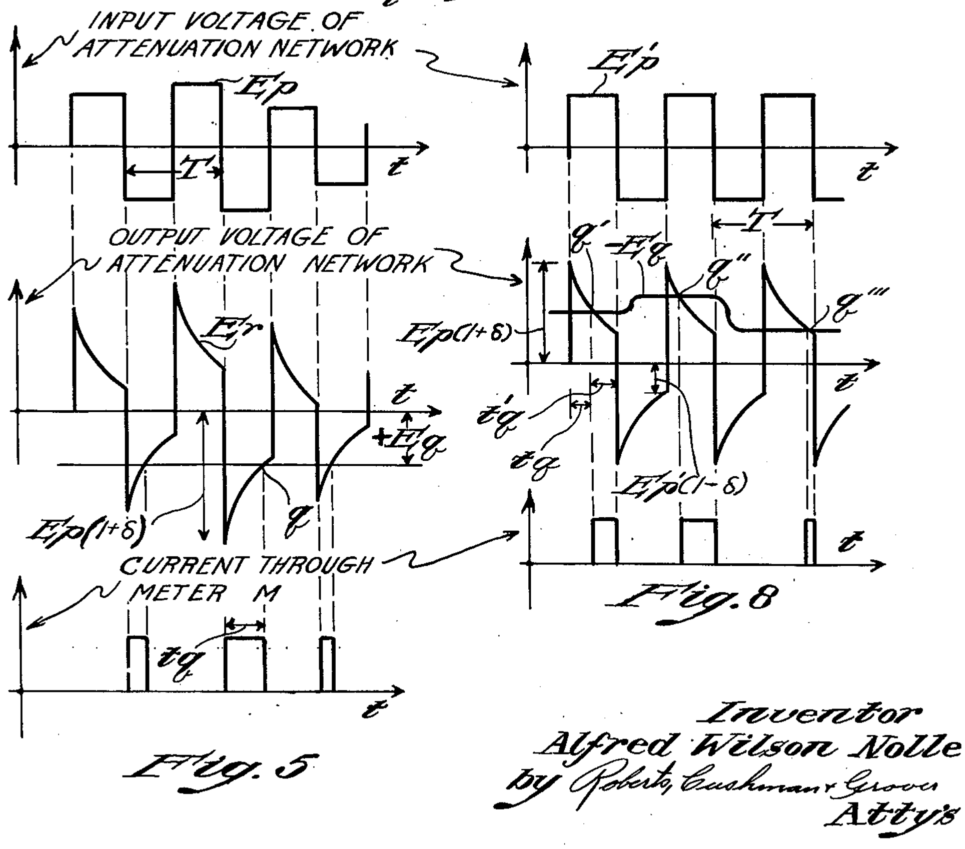
Fig. 5 is a graphical representation of the input and output voltages of the attenuation network and the current through the meter M of Fig. 4 as a function of time.
Fig. 8 is a graphical representation of the input and output voltages and the current through the meter M of Fig. 7 as a function of time.

Operation of the above embodiment of the invention can best be understood by referring to the block diagram (Fig. 3) and the voltage time curves of the input and output of the attenuation network shown in Fig. 5. As described in detail heretofore, the input signal applied between the terminals t1 and t2 by a microphone or other input signal source is amplified and rectified by the tubes V1 and V2 respectively whereupon it appears as positive and negative potentials balance with respect to the point $x$ (Fig. 4) on the cathode k32 and the anode p31 respectively of the tube V3.

The voltage $Ep$ (top curve Fig. 5) impressed upon the attenuation network is obtained from the square wave output voltage from the generator tube V6, the amplitude of which is proportional to the magnitude of the input signal source because of the limiting action of the tube V3, as described heretofore. The output voltage of the attenuation network, as impressed upon the grid g51, is shown in the center curve of Fig. 5 as $Er$. The peak of this voltage is $Ep\ (1+\delta)$ where $\delta=\tanh\ (T/4RC)$, T being the period of the square wave and R and C the total ohmic resistive impedance and the capacitance of the attenuation network. The increment $\delta Ep$ is added to the input voltage $Ep$ because the capacitor C charges almost completely during each half cycle of the square wave. During the negative portion of the cycle when $Er$ is greater in magnitude than $Eq$ (the positive voltage bias supplied by the bleeder resistor br7), a negative potential is impressed upon the grid g51 of the tube V5 thereby resulting in a current flow through the meter M. After the output voltage $Er$ has attenuated beyond the point $q$, $Er$ is lesser in magnitude than $Eq$ so that the grid g51 becomes positive, thereby blocking the second triode in the tube V5 and the current flow through the meter M in the manner described in detail heretofore.

The above action is clearly shown in Fig. 5. As each successive negative voltage square wave peak is applied to the attenuation network, its amplitude is attenuated according to the expression:

$$E=(1+\delta)\ Ep \exp\ (-t/RC)$$

During the portion of the attenuation when the grid g51 is negative, a pulse of current flows through the second triode of tube V5 and through the meter M. After the negative voltage has attenuated to the point $q$ where it is equal in magnitude to the positive bias voltage $Eq$, further attenuation causes the grid g51 to come under the influence of the dominating positive voltage $Eq$, thereby stopping the current flow through the meter M. The elapsed time $tq$ for the attenuation is expressed:

$$tq=RC[1nEp\ (1+\delta)-1nEq]$$

R, C and $Eq$ are constants and $\delta$ is constant for any given frequency so that:

$$tq=\text{constant}\times 1nEp$$

i. e., the elapsed time is proportional to the natural logarithm of amplitude of the input signal. This relationship holds as long as the amplitude of $Ep$ is small enough so that $tq$ is less than one-half of the period T of the square wave.

The meter M acts as a timing device measuring the average energy level in the successive current pulses. As the voltage is maintained constant by the glow tube N, only a measurement of current is necessary to obtain an energy indication so that a millimeter can be used. The voltage limiting action of the glow tube N maintains a constant current flow during each pulse so that the indication of the meter is proportional to the time duration of the pulses and is, therefore, proportional to the natural logarithm of amplitude of the input signal. The movement of the meter pointer during the intervals between pulses is eliminated by the electrical damping provided by the capacitor c13. It will of course be understood that other integrating electrical instruments, for example a watt hour meter, a volt-meter measuring the voltage across a capacitor charged by the pulses, or a cathode-ray oscillograph, may be used to replace the meter M as a timing device.

Figure 6:
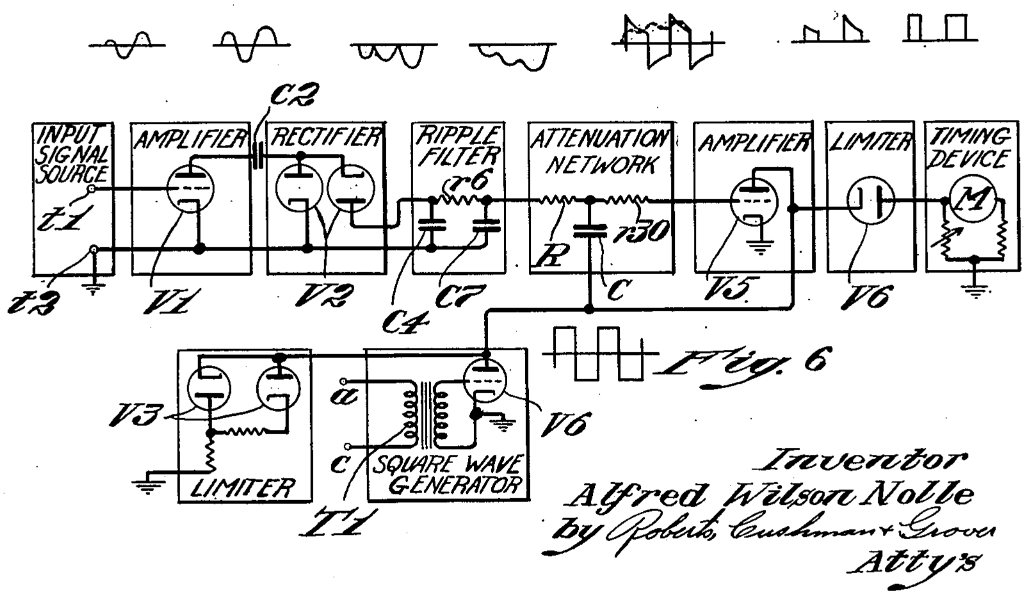
Fig. 6 is a block diagram of a third embodiment of the invention showing another means whereby the output signal is logarithmically correlated to a varying input signal.

In Figs. 6 and 7 is shown a third embodiment of the invention whereby a continuous varying input signal is employed to produce a varying direct voltage which serves as a standard of attenuation. A square wave having fixed frequency and amplitude is then attenuated by a network having a logarithmic voltage-time characteristic to obtain a logarithmic response.

The input signal is impressed upon the terminals t1 and t2 (Figs. 6 and 7) which are coupled to the respective ends of a potentiometer r1 by means of a coupling capacitor c1. The adjustable tap of the potentiometer r1 is linked with the grid g1 of an amplifying vacuum tube V1. The grid bias is supplied by connecting the tube cathode k1 to ground through a biasing resistor r2. A coupling capacitor c2 links the circuit of the tube anode p1 with the anode p21 and the cathode k22 of the double diode rectifier vacuum tube V2. The anode p22 and the cathode k21 of tube V5 are joined to the ungrounded and grounded input terminals, respectively, of a load resistor r12. The direct potential developed across the resistor r12 is applied to a ripple filter comprising a resistor r6 connected in series between the anode p22 and the input terminal of a resistor R of an attenuation network. The filter capacitors c4 and c7 are connected between the terminals of the resistor r6 and ground in parallel with the load resistor r12.

The lead from the other terminal of the resistor R branches to connect with the grid g51 of a double triode tube V5 through a resistor r30 and with the capacitor C which is the other element of the attenuation network. The capacitor C is also connected with the anode p61 of a double triode tube V6 so that a square wave is impressed upon the attenuation network when the grid g61 is excited by the sine wave from the transformer secondary T1*s*.

The amplitude of the square wave is maintained constant by the limiting action of the double diode tube V3, the anode p31 and cathode k32 of which are joined with the anode p61 of the square wave generator tube V6. The anode p32 and the cathode k31 are connected to the respective terminals of a bleeder resistor r71 which is connected in series with the bleeder resistors r72 and r73 between the B+ terminal of the direct power supply and ground. It can be seen that the positive and negative peaks of the square wave are limited to the level of the potentials maintained at the cathode k31 and the anode p32 by the voltage drop in the bleeder resistors r71 and r72, as whenever either the positive or negative potential level is exceeded the corresponding diode conducts to complete a relatively low resistance path to ground.

With the exception that the anode p51 of the tube V5 is connected to the anode p61 rather than directly to the direct power supply by means of the resistor 21, the tubes V5 and V6, the meter M and the associated circuits are connected and operate in analogous manner to the corresponding elements of the preceding embodiment which have been described in detail heretofore. By the above-mentioned change in anode power supply, during the negative half of each square wave on the grid g51, the tube V5 is prevented from energizing the meter M in the manner described heretofore because such negative potential is also impressed upon the anode p51 and the second grid g52. With a negative potential on the grid g52, the second triode in tube V does not conduct and no current flows through the meter M to give a false indication.

*Operation of the embodiment in Fig. 7*

Operation of the above-described circuits can best be understood by reference to the block diagram (Fig. 6). A square wave potential from the square wave generator tube V6 and maintained at constant amplitude by the limiter tube V3, is impressed continuously upon the capacitor C of the attenuation network. The signal from the input signal source is impressed upon the grid g1 of the amplifying tube V1 of the terminals t1 and t2. The output of tube V1 is rectified by the double diodes in the tube V2, passes through the ripple filter, and is thereupon impressed in the grid g51.

As described in connection with the operation of the embodiment shown in Fig. 4, the capacitor C of the attenuation network does not discharge completely during the period T' (Fig. 8) between successive waves so that the voltage impressed upon the network by each successive cycle is $Ep(1+\delta)$. As discussed in detail heretofore, the attenuation time may be expressed $tq=RC[\ln E'p(1+\delta)-\ln E'q]$, wherein the term $\ln E'q$ has a negative algebraic sign. By measuring the time interval $t'q$ (Fig. 8), this negative quantity is eliminated as:

$$t'q=T/2-RC[\ln E'p(1+\delta)-\ln E'q]$$

where T is the period of the square wave, and R and C are the values of the effective resistance and capacitance, respectively, of the attenuation network which are constant so that:

$$t'q=\text{constant}+RC\ln E'q$$

i. e., $t'q$ is proportional to the natural logarithm of the input signal amplitude.

As is clearly indicated in Fig. 8, at the start of each positive cycle of the square wave, a positive potential $E'p(1+\delta)$ is impressed upon the grid g51 so that no current flows through the meter M, because of the blocking action of the tube V5, as was described in detail with respect to the first embodiment. As the capacitor C charges the current flowing in the attenuation network, and, therefore, the voltage drop across the resistor R decreases until it is equal in magnitude and opposite in polarity to the rectified signal $-Eq$ as at points $q'$, $q''$, and $q'''$. The grid then becomes negative thereby causing the second triode in the tube V6 to conduct. This conduction takes place for a time $t'q$, i. e., until the beginning of the next negative cycle of the square wave impresses a negative potential upon the anode p62 as described above.

The successive surges of current through the meter M are integrated and averaged thereby, in the same manner as described in detail heretofore, so that the resulting meter indication is a logarithmic measure of the magnitude of the input signal.

I claim:

1. An electrical system with an output signal varying logarithmically with respect to an input signal comprising an attenuation network having a logarithmic voltage time characteristic, a source of potential with a magnitude proportional to said input signal, a source of constant peak potential, connections for energizing said network from one of said sources and for directly applying the other of said sources to the network as a comparative attenuation standard, and a timing device including an integrating instrument for measuring electrical energy and an amplifier for connecting the instrument to the output of the network, said amplifier being biased to conduct only during the respective time intervals required for attenuation between the limits of a potential equal in magnitude and opposite in polarity to the potential of said comparative standard and a potential with a magnitude determined by the magnitude of the potential of the energizing source whereby the instrument indication is proportional to the current pulses applied thereto, thereby to express a logarithmic correlation of the amplitudes of the input and output signals.

2. An electrical system with an output signal varying logarithmically with respect to the input signal comprising an attenuation network having a logarithmic voltage time characteristic, a source of constant peak potential, a source of potential with a magnitude proportional to said input signal, connections for energizing said network from the source of constant peak potential and for applying the input signal source thereto as a comparative attenuation standard, and a timing device including an integrating instrument for measuring electrical energy and an amplifier for connecting the instrument to the output of the network, said amplifier being biased to conduct only during the respective time intervals required for attenuation between a potential equal in magnitude and opposite in polarity to the potential of said comparative standard and a potential with a magnitude determined by the magnitude of the peak potential and the rate of attenuation of said network whereby the instrument indication is proportional to the current pulses applied thereto, thereby to express a logarithmic correlation of the amplitudes of the input and output signals.

3. An electrical system with an output signal varying logarithmically with respect to an input signal comprising an attenuation network having a logarithmic voltage time characteristic, a constant peak potential source used as a comparative attenuation standard, a potential source proportional in magnitude to said input signal, connections for energizing said network from the source proportional to said input signal and for directly applying the constant peak potential source thereto, and a timing device including an integrating instrument for measuring electrical energy and an amplifier for connecting the instrument to the output of the network, said amplifier being biased to conduct only during the respective time intervals from the energization of said network by the source proportional to the input signal until the attenuation reaches a potential equal in magnitude and opposite in polarity to the potential of the comparative standard whereby the instrument indication is proportional to the current pulses applied thereto, thereby to express a logarithmic correlation of the input and output signals.

4. An electrical system with an output signal varying logarithmically with respect to an input signal comprising an attenuation network with a reactive impedance and a resistor connected in series therewith, a source of potential with a magnitude proportional to said input signal, a source of constant peak potential, connections including said resistor for energizing said impedance from one of said sources and for applying to the network the other of said sources as a comparative attenuation standard, and a timing device including an integrating instrument for measuring electrical energy and an amplifier for connecting the instrument to the output of the network, said amplifier being biased to conduct only during the respective time intervals required for attenuation between the limits of a potential equal in magnitude and opposite in polarity to the potential of said comparative standard and a potential with a magnitude determined by the magnitude of the potential of the energizing source, whereby the instrument indication is proportional to the current pulses applied thereto, thereby to express a logarithmic correlation of the amplitudes of the input and output signals.

5. An electrical system with an output signal varying logarithmically with respect to the input signal comprising an attenuation network with a reactive impedance and a resistor connected in series therewith, a source of constant peak potential, a source of potential proportional in magnitude to said input signal, connections including said resistor for energizing said impedance from the source of constant peak potential and applying the potential source proportional to the input signal to the network as a comparative attenuation standard, and a timing device including an integrating instrument for measuring electrical energy and an amplifier for connecting the instrument to the output of the network, said amplifier being biased to conduct only during the respective time intervals required for attenuation between a potential equal in magnitude and opposite in polarity to the potential of the comparative standard and a potential with a magnitude determined by the magnitude of the peak potential and the rate of attenuation of said network whereby the instrument indication is proportional to the current pulses applied thereto, thereby to express a logarithmic correlation of the amplitudes of the input and output signals.

6. An electrical system with an output signal varying logarithmically with respect to an input signal comprising an attenuation network with a reactive impedance and a resistor connected in series, a source of potential proportional in magnitude to said input signal, a constant peak potential source used as a comparative attenuation standard, connections including said resistor for energizing said impedance from said source proportional to said input signal and for applying constant peak potential source to the network, and a timing device including an integrating instrument for measuring electrical energy and an amplifier for connecting the instrument to the output of the network, said amplifier being biased to conduct only during the respective time intervals from the energization of said network by the source proportional to said input signal until the attenuation reaches a potential equal in magnitude and opposite in polarity to the potential of the comparative standard whereby the instrument indication is proportional to the current pulses applied thereto, thereby to express a logarithmic correlation of the amplitudes of the input and output signals.

7. An electrical system with an output signal varying logarithmically with respect to an input signal comprising an attenuation network having a logarithmic voltage time characteristic, a square wave generator supplying a constant peak potential, a source of potential with a magnitude proportional to said input signal used as a comparative attenuation standard, connections for energizing said network from said square wave generator and for applying to the network the source proportional to the input signal, and a timing device including an integrating instrument for measuring electrical energy and an amplifier for connecting the instrument to the output of the network, said amplifier being biased to conduct only during the respective time intervals starting from the time the potential of the attenuation network is equal in magnitude and opposite in polarity to the potential of said comparative standard and terminating at the start of the next half-wave cycle whereby the instrument indication is proportional to the current pulses applied thereto, thereby to express a logarithmic correlation of the amplitudes of the input and output signals.

8. An electrical system with an output signal varying logarithmically with respect to an input signal comprising an attenuation network having a logarithmic voltage time characteristic, an input signal source, a generator supplying square wave potential with an amplitude proportional to the magnitude of said input signal source, a direct potential source for use as a comparative attenuation standard, connections for energizing said network from said generator and for applying the direct potential thereto, and a timing device including an integrating instrument for measuring electrical energy and an amplifier for connecting the instrument to the output of the network, said amplifier being biased to conduct only during the respective time intervals from the energization of said network by said generator until the attenuation reaches a potential equal in magnitude and opposite in polarity to the potential of the comparative standard whereby the instrument indication is proportional to the current pulses applied thereto, thereby to express a logarithmic correlation of the amplitudes of the input and output signals.

9. An electrical system with an output signal varying logarithmically with respect to an input signal comprising an attenuation network having a logarithmic voltage time characteristic, a source of potential with a magnitude proportional to said input signal, a source of constant peak potential, connections for energizing said network from one of said surces and for applying thereto the other of said sources as a comparative attenuation standard, and a timing device including a vacuum tube amplifier having a grid and cathode connected to the output terminals of said network and an anode, a current limiter and a meter connected in series with said anode, said vacuum tube being biased so that current flows through the meter only during the time intervals required for attenuation between the limits of a potential equal in magnitude and opposite in polarity to the potential of said comparative standard and a potential with a magnitude determined by the magnitude of the potential of the energizing source whereby the meter indication is proportional to the duration of the current pulses applied thereto, thereby to express a logarithmic correlation of the amplitudes of the input and output signals.

10. An electrical system with an output signal varying logarithmically with respect to the input signal comprising an attenuation network having a logarithmic voltage time characteristic, a source of square wave potential, an input signal source used as a comparative attenuation standard, connections for energizing said network from the source of square wave potential and for applying the input signal source thereto, and a timing device including a vacuum tube amplifier having a grid and a cathode connected to the output terminals of said network and an anode, a current limiter and a meter connected in series with said anode, said vacuum tube being biased so that current flows through said meter only during the successive intervals starting from the time the potential of the attenuation network is equal in magnitude and opposite in polarity to the potential of said comparative standard and terminating at the start of the next half-wave cycle, whereby the meter indication is proportional to the duration of the current pulses applied thereto, thereby to express a logarithmic correlation of the amplitude of the input and output signals.

11. An electrical system with an output signal varying logarithmically with respect to an input signal comprising an attenuation network having a logarithmic voltage time characteristic, an input signal source, a generator of square waves having an amplitude proportional to said input signal amplitude, a direct potential source used as a comparative attenuation standard, connections for energizing said network from said generator and for applying the direct potential source thereto, and a timing device including a vacuum tube amplifier having a grid and a cathode connected to the output terminals of said network and an anode, a current limiter and a meter connected in series with said anode, said vacuum tube being biased so that current flows through said meter only during the time intervals from the energization of said network by each of the successive waves from said generator until the wave potential attenuates to a potential equal in magnitude and opposite in polarity to the direct potential source whereby the meter indication is proportional to the duration of the current pulses applied thereto, thereby to express a logarithmic correlation of the amplitude of input and output signals.

12. An electrical system with an output signal varying logarithmically with respect to an input signal comprising an attenuation network having a logarithmic voltage time characteristic, a square wave generator with an output terminal connected to the input terminal of said network, two rectifying elements connected with said input signal source, one of said elements rectifying the positive portion of said signal, the other element rectifying the negative portion of said signal, a unidirectional element connecting the respective rectifying elements in the opposite sense with the output terminal of said generator so that the amplitude of the square wave potential impressed upon the network is proportional to said input signal, a constant direct potential connected to said network as a comparative attenuation standard, and a timing device including an integrating instrument for measuring electrical energy and an amplifier for connecting the instrument to the output of the network, said amplifier being biased to conduct only during each of the successive time intervals from the energization of said network by said generator until the attenuation reaches a potential equal in magnitude and opposite in polarity to the potential of the comparative standard whereby the instrument indication is proportional to the current pulses applied thereto, thereby to express a logarithmic correlation of the amplitudes of the input and output signals.

13. An electrical system with an output signal varying logarithmically with respect to an input signal comprising an attenuation network having a logarithmic voltage time characteristic, a square wave generator with an output terminal connected to the input terminal of said network, two rectifying elements connected with the input signal source, one of said elements rectifying the positive portion of said signal, the other element rectifying the negative portion of said signal, two unidirectional element each connected in the opposite sense with the output terminal of said generator, a ripple filter coupling each of the unidirectional elements each connected in the optifying element so that the amplitude of the square wave potential impressed upon the network is proportional to said input signal, a constant direct potential connected to said network as a comparative attenuation standard, and a timing device including an integrating instrument for measuring electrical energy and an amplifier for connecting the instrument to the output of the network, said amplifier being biased to conduct only during each of the successive time intervals from the energization of said network by said generator until the attenuation reaches a potential equal in magnitude and opposite in polarity to the potential of the comparative standard whereby the instrument indication is proportional to the current pulses applied thereto, thereby to express a logarithmic correlation of the amplitudes of the input and output signals.

14. An electrical system with an output signal varying logarithmically with respect to an input signal comprising an attenuation network having a logarithmic voltage time characteristic, a square wave generator with an output terminal connected to the input terminal of said network, a rectifying diode for the positive portion of said input signal having an anode linked with said signal source and a cathode, a limiter diode having a cathode coupled to the rectifying diode-cathode and an anode connected with the output terminal of said generator, a second rectifying diode for the negative portion of said input signal having a cathode linked with said signal source and an anode, a second limiter diode having an anode coupled to the second rectifying diode anode and a cathode connected with the output terminal of said generator, a direct power source connected to continuously circulate the small current through said diodes to increase the sensitivity and linearity thereof at low input signal levels, so that the amplitude of the square wave potential impressed upon said network is proportional to said input signal, a resistor connecting said source to said network to supply a positive potential as a comparative attenuation standard and a timing device including an integrating instrument for measuring electrical energy and an amplifier for connecting the instrument to the output of the network, said amplifier being biased to conduct only during each of the successive time intervals from the energization of said network by said generator until the attenuation reaches a potential equal in magnitude and opposite in polarity to the potential of the comparative standard whereby the instrument indication is proportional to the current pulses applied thereto, thereby to express a logarithmic correlation of the amplitudes of the input and output signals.

15. An electrical system with an output signal varying logarithmically with respect to an input signal comprising an attenuation network having a logarithmic voltage time characteristic, an input signal source, a source of square wave potential, connections for energizing said network from one of said sources and for applying thereto the other of said sources as a comparative attenuation standard, and a timing device including a vacuum tube amplifier having a grid and cathode connected to the output terminals of said network and an anode, a current limiter and a meter connected in series with said anode said vacuum tube being biased so that the current flows in the anode circuit only during the time interval required for attenuation between the limits of a potential equal in magnitude and opposite in polarity to the potential of said comparative standard and a potential with a magnitude determined by the amplitude of the square wave source potential, and a direct power source connected with said meter whereby a current is directed through the meter in a reverse direction when no current flows in the anode circuit whereby the meter indication is proportional to the duration of current pulses applied thereto, thereby to express a logarithmic correlation of the amplitudes of the input and output signals.

16. An electrical system with an output signal varying logarithmically with respect to an input signal comprising an attenuation network having a capacitor and a resistor connected in series therewith, an input signal source linked with the input terminals of said network, a constant direct negative potential source used as a comparative attenuation standard, a vacuum tube amplifier having a grid and cathode coupled by said attenuation standard with the output terminals of said network and an anode, and an integrating instrument for measuring electrical energy connected in the circuit of said anode, said grid being biased so that the vacuum tube conducts only during the time interval from the energization of said network by said signal source until the attenuation reaches a potential equal in magnitude and opposite in polarity to that of said comparative standard whereby the instrument indication is proportional to the current pulses applied thereto, thereby to express a logarithmic correlation of the amplitde of the input and output signals.

17. An electrical system with an output signal varying logarithmically with respect to an input signal comprising an input signal source, an attenuation network including a reactive impedance and resistor series connected therewith, a square wave generator with an output terminal connected to the input terminal of said network, two rectifying elements connected with said input signal source one of said elements rectifying the positive portion of said signal, the other element rectifying the negative portion of said signal, two unidirectional elements each connected in the opposite sense with the output terminal of said generator, a ripple filter coupling each of the unidirectional elements with the respective rectifying elements so that the amplitude of the square wave impressed upon said network is proportional to said input signal, a constant positive potential source connected to said network as a comparative attenuation standard and a timing device including a vacuum tube amplifier having a grid and a cathode connected to the output terminals of said network and an anode, a unidirectional current limiter and a meter connected in series with said anode, said vacuum tube amplifier being biased so that current flows in the anode circuit only during each of the successive time intervals from the energization of said network by the generator until the potential reaches a potential equal in magnitude and opposite in polarity to the potential of the comparative attenuation standard whereby the meter indication is proportional to the duration of the current pulses supplied thereto, thereby to express a logarithmic correlation of the amplitude of the input and output signals.

18. An electrical system with an output signal varying logarithmically with respect to an input signal comprising an input signal source, an attenuation network including a reactive impedance and a resistor connected in series therewith, a full wave rectifier connected with said input signal source, a ripple filter coupling the rectifier with the input terminal of said network whereby a negative potential proportional to the amplitude of the input signal is impressed upon the network as a comparative attenuation standard, a square wave generator having an output terminal connected to the input terminal of said network, and a timing device including a vacuum tube having a grid and a cathode connected to the output terminals of said network and an anode, a unidirectional current limiter and a meter connected in series with said anode, said vacuum tube being biased so that the current flows through said meter only during the successive intervals starting from the time the potential of the attenuation network is equal in magnitude and opposite in polarity to the potential of the comparative standard and terminating at the start of the next half square wave cycle whereby the meter indication is proportional to the duration of the current pulses applied thereto, thereby to express a logarithmic correlation of the amplitude of the input and the output signals.

19. An electrical system with an output signal varying logarithmically with respect to an input signal comprising an input signal source, an attenuation network including a capacitor and a resistor series connected therewith, a square wave generator with an output terminal connected to the input terminal of said network, a rectifying diode for the positive portion of said input signal having an anode linked with said signal source and a cathode, a ripple filter, a limiter diode having a cathode coupled to the rectifying diode cathode by said filter and an anode connected with the output terminal of said generator, a second rectifying diode for the negative portion of said input signal having a cathode linked with said signal source and an anode, a second ripple filter, a second limiter diode having an anode coupled to the second rectifying diode anode by said second filter and a cathode connected with the output terminal of said generator, a direct power source, a connection to continuously circulate a small current through said diodes to increase the sensitivity and linearity thereof at low input signal levels so that the amplitude of the square wave impressed upon the network is proportional to said input signal, a resistor connecting said direct power source to said network to supply a comparative attenuation standard potential, a timing device including a two stage amplifier having two interconnected vacuum tubes each having a cathode, a grid and an anode, the first stage grid and cathode being connected to the output terminals of said attenuation network, a series resistor connecting the first stage anode to the director power source, said anode also being directly linked to the second stage grid, a resistor connecting the second stage anode to the power source, a unidirectional current limiter and a meter connected in series between the second stage anode and the power source whereby during the time interval from the energization of the network by a negative wave from the square wave generator until the attenuation reaches a potential equal in magnitude and opposite in polarity to the comparative standard potential, the resultant negative potential on the grid prevents the first stage tube from conducting so that the positive potential on the second stage grid causing a current to flow through said meter, and connections between the power source and said meter directing a reverse current therethrough in the absence of current in the circuit of said second stage anode during the intervals when the first stage grid is at a positive potential, whereby the meter indication is proportional to the duration of the current pulses applied thereto, thereby to express a logarithmic correlation of the amplitudes of the input and output signals.

20. An electrical system with an output signal varying logarithmically with respect to an input signal comprising an input signal source, an attenuation network including a capacitor and a resistor series connected therewith, a full wave rectifier connected with said input signal source, a ripple filter coupling the rectifier with the input terminals of said attenuation network whereby a negative potential proportional to the amplitude of the input signal is impressed upon the network as a comparative attenuation standard, a square wave generator having an output terminal connected to the input terminal of said network, a direct power source, a bleeder resistor connected to said power source, a diode having a cathode connected to the more positive terminal of said bleeder resistor and an anode connected to the output terminal of said generator thereby to limit the positive peak amplitude of the square wave from said generator, a second diode having an anode connected to the more negative terminal of said bleeder resistor and a cathode connected to the output terminal of said generator thereby to limit the negative peak amplitude of the square wave from said generator, and a timing device including two vacuum tubes interconnected as a two-stage amplifier and each having a cathode, a grid and an anode, the first stage grid and cathode being connected to the output terminals of said attenuation network, a series resistor connecting the first stage anode to the output terminal of said generator, said anode also being directly linked to the second stage grid, a resistor connecting the second stage anode to the power source, a current limiter and a meter connected in series between the second stage anode and the power source whereby during the interval beginning at the time the potential of the attenuation network is equal in magnitude and opposite in polarity to the potential of the comparative standard and terminating at the start of the next half-way cycle by the reversal of polarity of the potential upon the first stage anode so that the meter indication is proportional to the duration of the current pulses applied thereto, thereby to express a logarithmic correlation of the amplitude of the input and output signals.

21. An electrical network for completely cutting off the flow of current in the output circuit in response to a predeterminate change in the potential of an input signal comprising a direct power source, an input signal source, a two-stage amplifier including two interconnected vacuum tubes each having a cathode, a grid and an anode, the first stage grid and cathode being connected to the output terminals of said input signal source, a series resistor connecting the first stage anode to the direct power source, said anode also being directly linked to the second stage grid, a resistor connecting the second stage anode to the power source, and a unidirectional element connected in series with the output terminals between the second stage anode and the power source in parallel with the resistor connecting the second stage anode to the power source, whereby the application to the first stage grid of a signal having a potential characteristic to cause a current flow through the resistor in series with the first stage anode results in a voltage drop which impresses upon the second stage grid negative potential sufficient to cut off the second stage tube so that a positive potential is impressed upon the unidirectional element in the sense to prevent said element from conducting.

22. An electrical network for completely cutting off the flow of current in the output circuit in response to a predeterminate change in the potential of an input signal comprising a direct power source having a voltage apportioning impedance connected thereto, an input signal source, a two-stage amplifier including two interconnected vacuum tubes each having a cathode, a grid and an anode, the first stage grid and cathode being connected to the output terminals of said input signal source, a series resistor connecting the first stage anode to the direct power source, said anode also being directly linked to the second stage grid, a resistor connecting the second stage anode to the power source, and a unidirectional element connected in series with the output terminals of said network between the second stage anode and a portion of said impedance at a lower voltage than the power source, whereby the application to the first stage grid of a signal having a potential characteristic to cause a current flow through the resistor in series with the first stage anode results in a voltage drop which impresses upon the second stage grid a negative potential sufficient to cut off the second stage tube so that a positive potential is impressed upon the unidirectional element in the sense to prevent said element from conducting.

23. An electrical system with an output signal varying logarithmically with respect to an input signal comprising an input signal source, an attenuation network including a capacitor and a resistor series connected therewith, a square wave generator with an output terminal connected to the input terminal of said network, a rectifying diode for the positive portion of said input signal having an anode linked with said signal source and a cathode, a ripple filter, a limiter diode having a cathode coupled to the rectifying diode cathode by said filter and an anode connected with the output terminal of said generator, a second rectifying diode for the negative portion of said input signal having a cathode linked with said signal source and an anode, a second ripple filter, a second limiter diode having an anode coupled to the second rectifying diode anode by said second filter and a cathode connected with the output terminal of said generator, a direct power source having a voltage apportioning impedance connected thereto, a connection to said impedance for continuously circulating the small current through said diodes to increase the sensitivity and linearity thereof at low input signal levels so that the amplitude of the square wave impressed upon the network is proportional to said input signal, a resistor connecting said voltage apportioning impedance to said network to supply a comparative attenuation standard potential, a timing device including a two stage amplifier having two interconnected vacuum tubes each having a cathode, a grid and an anode, the first stage grid and cathode being connected to the output terminals of said attenuation network, a series resistor connecting the first stage anode to the direct power source, said anode also being directly linked to the second stage grid, a resistor connecting the second stage anode to the power source, a unidirectional current limiter and a meter connected in series between the second stage anode and a portion of said impedance at a lower potential than the power source, said second stage cathode being connected to a portion of said impedance at a lower potential than the meter connection, whereby during the time interval from the energization of the network by a negative wave from the square wave generator until the attenuation reaches a potential equal in magnitude and opposite in polarity to the comparative standard potential, the resultant negative potential on the grid prevents the first stage tube from conducting so that the positive potential on the second stage grid causing a current to flow through said meter, and connections between the power source and said meter directing a reverse current therethrough in the absence of current in the circuit of said second stage anode during the intervals when the first stage grid is at a positive potential, whereby the meter indication is proportional to the duration of the current pulses applied thereto, thereby to express a logarithmic correlation of the amplitudes of the input and output signals.

24. An electrical system with an output signal varying logarithmically with respect to an input signal comprising an input signal source, an attenuation network, including a capacitor and a resistor series connected therewith, a full wave rectifier connected with said input signal source, a ripple filter coupling the rectifier with one of the input terminals of said attenuation network whereby a negative potential proportional to the amplitude of the input signal is impressed upon the network as a comparative attenuation standard, a square wave generator having an output terminal connected to the second input terminal of said network, a direct power source having a voltage apportioning impedance connected thereto, a bleeder resistor connected to said power source, a diode having a cathode connected to the more positive terminal of said bleeder resistor and an anode connected to the output terminal of said generator thereby to limit the positive peak amplitude of the square wave from said generator, a second diode having an anode connected to the more negative terminal of said bleeder resistor and a cathode connected to the output terminal of said generator thereby to limit the negative peak amplitude of the square wave from said generator, and a timing device including two vacuum tubes interconnected as a two stage amplifier and each having a cathode, a grid and an anode, the first stage grid and cathode being connected to the output terminals of said attenuation network, a series resistor connecting the first stage anode to the output terminal of said generator, said anode also being directly linked to the second stage grid, a resistor connecting the second stage anode to the power source, a current limiter and a meter connected in series between the second stage anode and a portion of the impedance at a lower potential than the power source said second stage cathode being connected to a portion of said impedance at a lower potential than the meter connection, whereby during the interval beginning at the time the potential of the attenuation network is equal in magnitude and opposite in polarity to the potential of the comparative standard and terminating at the start of the next half-way cycle by the reversal of polarity of the potential upon the first stage anode so that the meter indication is proportional to the duration of the current pulses applied thereto, thereby to express a logarithmic correlation of the amplitude of the input and output signals.

ALFRED WILSON NOLLE.

(References on following page)

REFERENCES CITED

The following references are of record in the file of this patent:

UNITED STATES PATENTS

| Number | Name | Date |
|---|---|---|
| 1,622,851 | Smith | Mar. 29, 1927 |
| 2,133,670 | Schuchmann | Oct. 18, 1938 |
| 2,258,732 | Blumlein et al. | Oct. 14, 1941 |
| 2,266,509 | Percival et al. | Dec. 16, 1941 |
| 2,313,666 | Peterson | Mar. 9, 1943 |